United States Patent Office 2,769,843
Patented Nov. 6, 1956

2,769,843

TRICYCLODECANE-(5,2,1,0$^{2,6}$)-TRIOL-(3,4(8—9))

Hans Feichtinger, Duisburg-Beeck, Germany, assignor to Ruhrchemie Aktiengesellschaft, Oberhausen-Holten, Germany, a corporation of Germany No Drawing. Application December 30, 1953, Serial No. 401,423

Claims priority, application Germany January 17, 1953

9 Claims. (Cl. 260—617)

This invention relates to and has as its object the production of tricyclodecane-(5,2,1,0$^{2,6}$)-triol-(3,4,(8—9)), which has been found to constitute a highly valuable intermediate for the production of alkyd resins and for various organic syntheses. The designation of this ring system corresponds to the nomenclature of "Chemical Abstracts" (The Naming and Indexing of Chemical Compounds, "Chemical Abstracts," page 5884, paragraph 107 (1945)).

In accordance with the invention the tricyclodecane-(5,2,1,0$^{2,6}$)-triol-3,4,(8—9)) is produced by treating the exo-isomer of dihydrohydroxy dicyclopentadiene with a hydroxylating agent.

The starting dihydrohydroxy dicyclopentadiene and its production have been described by Bruson and Riener (Journal of the American Chemical Society, vol. 67, page 726 (1945)), and was designated as hydroxy-dihydronor-dicyclopentadiene. It was, however, later determined that this compound was actually the hydroxy derivative of the exo-isomer of dihydro dicyclopentadiene, having the hydroxy group in either the 8 or 9 position. This exo-isomeric form is indicated by F. Bergmann and H. Japhe (Journal of the American Chemical Society, vol. 69, page 1827 (1947)). The compound may be designated as exo-tricyclo-(5,2,1,0$^{2,6}$)-decene-(3)-ol-(8—9).

As is indicated, the unsaturated double bond is between the 3 and 4 position; in which positions the hydroxyl groups will add upon treatment with the hydroxylating agent to form the new compound in accordance with the invention. The reaction takes place in accordance with the following reaction scheme:

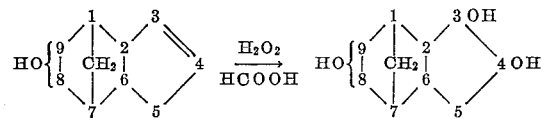

The starting tricyclo-(5,2,1,0$^{2,6}$)-decene-(3)-ol-(8—9) may be formed by the addition of a hydrating compound to dicyclopentadiene in such known manner. Thus, for example, the dicyclopentadiene may be reacted with dilute sulfuric acid. The hydroxyl group adds either to the 8 or 9 position, depending upon direction of addition of the hydrating compound, thus forming two isomers, one having the OH in the 8 position, and the other in the 9 position. This is indicated in the designation of the compound by the "ol-(8—9)." The tricyclodecane-(5,2,1,0$^{2,6}$)-triol-(3,4,(8—9)) formed by treating the starting product with the hydroxylating agent, may also be present in two isomeric forms, i. e., one form having the OH in the 8 position, and the other form having the OH in the 9 position, which are designated as "triol-(3,4,(8—9))."

The hydroxylating agents used in accordance with the invention are preferably hydrogen peroxide and formic acid. The reaction takes place by the addition of two hydroxyl groups forming the triol mentioned with the preservation of the ring system, as shown in the above reaction scheme in which the steric arrangement of the atom skeleton has been disregarded.

The reaction is suitably effected in concentrated formic or acetic acid, possibly in the presence of a catalyst, such as selenium dioxide, osmium tetraoxide, tungsten trioxide, vanadium pentoxide, etc. It is also possible to effect this reaction by means of ultraviolet light. Instead of concentrated acids, other suitable solvents may be used, such as tertiary butanol or acetone with the use of hydrogen peroxide. The reaction is generally effected at a temperature ranging from between 10 and 100° C. and at atmospheric pressure. 1–3 mols hydrogen peroxide and 5–20 mols concentrated formic acid or acetic acid are preferably allowed to act upon one mole tricyclo-(5,2,1,0$^{2,6}$)-decene-3-ol-(8—9). A concentration of hydrogen peroxide of 30% by weight and still higher may be used, the reaction being preferably effected with the commercial 30% aqueous hydrogen peroxide solution.

By means of the catalysts, a considerably shortening of the reaction time is possible. In this way, undesirable side reactions are avoided. The quantity of the catalyst should amount to about 0.1–2% by weight of the tricyclo-(5,2,1,0$^{2,6}$)-decene-3-ol-(8—9) charged.

The conversion in the formic or acetic acid results in partially esterified products, from which the desired triol may be recovered in a short period of time by treatment with an alkali such as sodium or potassium hydroxide. The trihydric alcohol in accordance with the invention is a liquid which will distil at a temperature of from 212–215° C. under a vacuum of 1.0 mm./Hg and will solidify in the receiver to form a glass-like substance. The compound is hygroscopic and miscible with alcohol and water in any proportion. As mentioned, it is highly useful as an intermediate for alkyd resins, cross-linking agents, and various organic syntheses. Thus, from the newly obtained tricyclodecane - (5,2,1,0$^{2,6}$) - triol - (3,4, (8—9)), the tricyclodecane - (5,2,1,0$^{2,6}$) - triol - (3,4, (8—9))-tri-benzoic acid ester could be obtained by reaction with benzoyl chloride by the method of Scholten-Baumann.

The following examples are given by way of illustration and not limitation.

*Example 1*

370 grams tricyclo - (5,2,1,0$^{2,6}$) - decene - 3-ol - (8—9) were slowly passed into a mixture of 350 cc. of 30% by weight hydrogen peroxide and 1500 cc. 88% by weight formic acid while stirring the mixture. The temperature slowly increased to 45° C. and was maintained at this level by cooling until it decreased of itself. The mixture was then heated for 24 hours at this temperature and was allowed to cool to room temperature during the night. Thereafter, the excess quantities of hydrogen peroxide and formic acid were distilled off, leaving a water-white, strongly yellow viscous residue. This residue, while thoroughly rotating the flask, was slowly mixed with a solution of 250 grams solid sodium hydroxide in 400 cc. of water in order to saponify the partially esterified triol. All of the reaction mixture was then transferred into an extraction apparatus where it was exhaustively extracted with acetic ester. From the extract solution, the tricyclodecane-(5,2,1,0$^{2,6}$)-triol-(3,4,(8—9)) was obtained as an oily, viscous liquid, which was relatively little soluble in acetic ester, and which was fractionated under vacuum.

As the main fraction, there was obtained a water-white, highly viscous oil, having a boiling point of 212–215° C. (1 mm. Hg), and amounting to 341 grams, which corresponded to 75% of the theoretically expected quantity. The oil immediately solidified in the receiver to give a glass-like mass.

The empirical formula was $C_{10}H_{16}O_3$ (184.23).

| Analysis | Calculated | Found |
|---|---|---|
| C...........percent | 65.20 | 65.13 |
| H...........do | 8.69 | 8.51 |
| O...........do | 26.06 | 26.26 |
| Hydroxyl number | 914 | 910 |

Example 2

150 grams tricyclo-$(5,2,1,0^{2,6})$-decene-3-ol-(8—9) were slowly passed into a mixture of 140 cc. 30% by weight hydrogen peroxide solution, 600 cc. glacial acetic acid and 2.0 grams tungsten trioxide. While vigorously stirring, the temperature slowly increased and was finally maintained for 10 hours at 50° C. After the termination of the reaction, the excess quantities of hydrogen peroxide, acetic acid and water were sucked off in a water jet vacuum and the remaining residue was saponified with a mixture of 120 grams sodium hydroxide in 300 cc. of water. All of the reaction mixture was then transferred into an extraction apparatus where it was exhaustively extracted with acetic ester. From the extract solution, after having distilled off the extracting agent, there was obtained the raw triol which was distilled in the manner described in Example 1. This resulted in 129 grams tricyclodecane-$(5,2,1,0^{2,6})$-decene-3-ol-(8—9) corresponding to 70% of the theoretically possible yield.

Example 3

150 grams tricyclo-$(5,2,1,0^{2,6})$-decene-3-ol-(8—9), in the manner described in Example 2, were slowly passed into a mixture of 140 cc. 30% by weight hydrogen peroxide solution, 600 cc. glacial acetic acid and 1.0 gram vanadium pentoxide. The reaction commenced at once. The reaction mixture was allowed to stand for 8 hours at 40° C. while stirring. Then the excess quantities of hydrogen peroxide, acetic acid and water were distilled off and the residue was processed in the manner described in Example 1. Tricyclodecane-$(5,2,1,0^{2,6})$-triol-(3,4,-(8—9)) in amount of 132 grams corresponding to 72% of the theoretically possible yield were obtained.

I claim:
1. As a new chemical compound tricyclodecane-$(5,2,1,0^{2,6})$-triol-(3,4,(8—9)).
2. Process for the production of tricyclodecane-$(5,2,1,0^{2,6})$-triol-(3,4,(9—9)), which comprises reacting tricyclo-$(5,2,1,0^{2,6})$-decene-(3)-ol-(8—9) with hydrogen peroxide and an acid selected from the group consisting of formic acid and acetic acid at a temperature of between 10 and 100° C. contacting the partially esterified product formed with an alkali, and recovering tricyclodecane-$(5,2,1,0^{2,6})$-triol-(3,4,(8—9)).
3. Process according to claim 2, in which 1–3 mols hydrogen peroxide in the form of an about 30% by weight aqueous solution are used per mol of tricyclo-$(5,2,1,0^{2,6})$-decene-3-ol-(8—9).
4. Process according to claim 2, in which 5–30 mols of a concentrated acid selected from the group consisting of formic and acetic acid are used per mol tricyclo-$(5,2,1,0^{2,6})$-decene-3-ol-(8—9).
5. Process according to claim 2, in which said reaction is effected in the presence of a metal oxide catalyst selected from the group consisting of selenium dioxide, osmium tetraoxide, tungsten trioxide and vanadium pentoxide.
6. Process according to claim 5, in which said catalyst is added in amount of 0.1–2% by weight of the tricyclo-$(5,2,1,0^{2,6})$-decene-3-ol-(8—9) charged.
7. Process according to claim 5, in which said reaction is effected at a temperature of 40–50° C.
8. Process according to claim 5 in which said catalyst is tungsten trioxide.
9. Process according to claim 5 in which said catalyst is vanadium pentoxide.

References Cited in the file of this patent

UNITED STATES PATENTS

| 2,500,599 | Bergsteinsson et al. | Mar. 14, 1950 |
| 2,555,927 | Himel | June 5, 1951 |

OTHER REFERENCES

Bergmann et al.: J. A. C. S., vol. 69, pp. 1826–1827 (1947).